United States Patent
Chen

(10) Patent No.: US 11,506,796 B2
(45) Date of Patent: Nov. 22, 2022

(54) METHOD, APPARATUS AND MOBILE DEVICE FOR EXTENDING REAL-TIME KINEMATIC POSITIONING DURING REFERENCE DATA OUTAGE

(71) Applicant: Unicore Communications, Inc., Beijing (CN)

(72) Inventor: Kongzhe Chen, Fremont, CA (US)

(73) Assignee: UNICORE COMMUNICATIONS, INC., Beijing (CN)

( * ) Notice: Subject to any disclaimer, the term of this patent is extended or adjusted under 35 U.S.C. 154(b) by 358 days.

(21) Appl. No.: 16/294,456

(22) Filed: Mar. 6, 2019

(65) Prior Publication Data
US 2020/0158885 A1 May 21, 2020

Related U.S. Application Data

(60) Provisional application No. 62/770,278, filed on Nov. 21, 2018.

(51) Int. Cl.
*G01S 19/44* (2010.01)
*G01S 19/05* (2010.01)
*G01S 19/43* (2010.01)

(52) U.S. Cl.
CPC .............. *G01S 19/44* (2013.01); *G01S 19/05* (2013.01); *G01S 19/43* (2013.01)

(58) Field of Classification Search
CPC ............................ G01S 19/43–44; G01S 19/05
See application file for complete search history.

(56) References Cited

U.S. PATENT DOCUMENTS 6,278,945 B1 * 8/2001 Lin .................. G01S 19/44
701/472
6,408,178 B1 * 6/2002 Wickstrom ............ G01S 19/46
342/352

(Continued)

OTHER PUBLICATIONS

Trimble GPS Tutorial—Advanced Concepts, http://www.trimble.com/gps_tutorial/dgps-advanced.aspx, 4 pages, 2015 (Year: 2015).*

(Continued)

*Primary Examiner* — Bernarr E Gregory
*Assistant Examiner* — Fred H Mull
(74) *Attorney, Agent, or Firm* — Hauptman Ham, LLP

(57) ABSTRACT

A method includes processing reference data and positioning signals to determine a first position of a rover station for a first instance in time. A first pseudo-range measurement of a frequency and a first carrier phase measurement of the frequency are calculated. The method also includes detecting an inability to receive the reference data and generating virtual reference data based on the reference data, the position of the rover station, the first pseudo-range measurement, and the first carrier phase measurement. A second pseudo-range measurement of the frequency and a second carrier phase measurement of the frequency are calculated. The method further includes processing the virtual reference data, the positioning signals, the second pseudo-range measurement and the second carrier phase measurement, based on the detected inability to receive the reference data, to determine a second position of the rover station for a second instance in time.

20 Claims, 4 Drawing Sheets

(56) References Cited

U.S. PATENT DOCUMENTS

| | | | |
|---|---|---|---|
| 7,498,979 B2* | 3/2009 | Liu | G01S 19/44 342/357.27 |
| 2010/0079333 A1* | 4/2010 | Janky | G01S 19/43 342/357.24 |
| 2014/0002299 A1* | 1/2014 | Leandro | G01S 19/43 342/357.27 |
| 2017/0139050 A1* | 5/2017 | Curran | G01S 19/40 |
| 2017/0299728 A1* | 10/2017 | Lie | G01S 19/43 |

OTHER PUBLICATIONS

B. Hofmann-Wellenhof et al., Global Positioning System: Theory and Practice, Springer-Verlag Wien, p. 179-227 (Year: 1992).*

* cited by examiner

METHOD, APPARATUS AND MOBILE DEVICE FOR EXTENDING REAL-TIME KINEMATIC POSITIONING DURING REFERENCE DATA OUTAGE

PRIORITY CLAIM

The present application claims the priority benefit of U.S. Provisional Patent Application No. 62/770,278, filed Nov. 21, 2018, the entirety of which is hereby incorporated by reference.

BACKGROUND

Global Navigation Satellite Systems (GNSS) are used for positioning, navigation and timing. Some examples of Global Navigation Satellite Systems include Global Positioning System (GPS), Global Navigation System (GLONASS), Beidou Navigation Satellite System (BDS), Galileo Satellite Navigation System (Galileo), Quasi-Zenith Satellite System (QZSS), and Indian Regional Navigation Satellite System (IRNSS).

A GNSS receiver tracks signals from satellites of one, several or all of these systems, gets pseudo-range and carrier phase measurements which can be used for positioning. Such measurements are often deteriorated by errors such as ionospheric effects, tropospheric delay, multipath errors, satellite orbit and clock errors, among others. Real-Time Kinematic (RTK) positioning is sometimes used to improve GNSS receiver accuracy by using reference data communicated to a receiver by a reference station.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
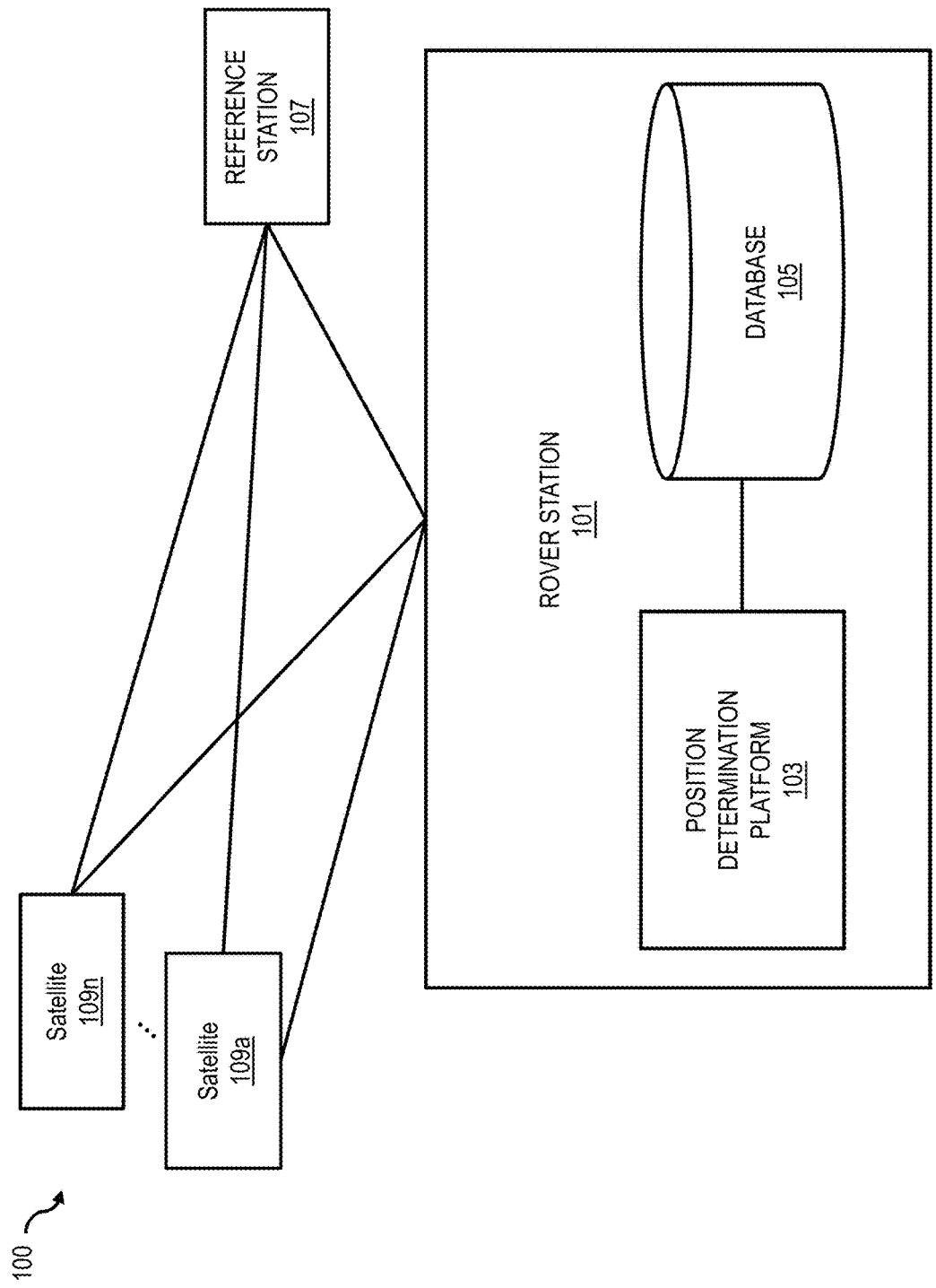
FIG. 1 is a diagram of system for extending RTK service, in accordance with one or more embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation or position of a first feature over or on a second feature in the description that follows may include embodiments in which the first and second features are formed or positioned in direct contact, and may also include embodiments in which additional features may be formed or positioned between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of an apparatus or object in use or operation in addition to the orientation depicted in the figures. The apparatus may be otherwise oriented (rotated 90 degrees or at other orientations) and the spatially relative descriptors used herein may likewise be interpreted accordingly.

Global navigation satellite systems (GNSS) provide GNSS receivers with the capability to determine their location based on positioning signals transmitted from the GNSS satellites in terms of longitude, latitude and altitude, to within a few meters or even centimeters.

GNSS based positioning has a wide range of applications, including navigation and tracking and automatic positioning.

Generally, for determining position, a GNSS receiver first determines distances to a plurality of GNSS satellites. Each individual distance measurement made by the receiver to a satellite located in a known orbit position traces the receiver on the surface of a spherical shell at the measured distance from the satellite. By taking several such measurements and determining an intersecting point of the spherical shells, a position fix can be generated. The distance measurements to the satellites are based on a time of flight measurement of positioning signals transmitted by the satellites to the receiver and thus the measurements depend on an exact timing.

In GNSS systems, the orbit position of a satellite is capable of being determined based on a data message superimposed on a code that serves as a timing reference. The receiver compares the time of broadcast at the satellite encoded in the transmission with the time of reception measured by an internal clock at the receiver, thereby measuring the time of flight to the satellite. Some GNSS systems include satellites that transmit a code with a timing reference, enabling a receiver to compare a successively delayed internal replica of this code with the received code from the satellite, and, when determining a match of the codes, to determine the amount of delay. This type of code based positioning allows accuracies within several meters.

For higher accuracies, Real-Time Kinematic (RTK) positioning employs measurements on a carrier phase of the positioning signals from the satellites. In RTK a code is not compared with a delayed internal version of the code. Rather, the carrier is used in the comparison process. By using the phase of the carrier signal from the satellite centimeter accuracy positioning can be achieved.

Various error sources affect the absolute positioning accuracy. As noted above, the exact time of flight of the signal from the satellite to the receiver station must be measured. In order to make the time measurements as accurate as possible, GNSS satellites generally include several atomic clocks providing a highly accurate time reference. Nonetheless, even atomic clocks suffer from a certain time error that constitutes an error source in the measurements that is observed when desiring centimeter-level accuracy. Other error sources deteriorate the positioning result, including propagation delays introduced by the troposphere and ionosphere, orbit errors in the satellite positions, relativistic effects, and cycleslip, among others.

To improve the accuracy of the estimation, RTK systems that perform a position determination based on carrier phase measurements often provide reference data from another source to a receiver or rover station, e.g. via ground based wired or wireless transmission, in order to enable the receiver or rover station to eliminate the positioning errors introduced by the error sources. For example, a reference station having an exact known position is usable for eliminating errors in the measurements taken by a rover station by transmitting measurements made at the reference station as reference data to the rover station, and using the reference data to eliminate the errors in the position determining process. For example, if an assumption is made that the errors in the receiver measurements and reference station measurements are the same, the rover station is often able to eliminate the errors by determining a difference between the measurement at the receiver and at the reference station.

In RTK, the reference station can be real or virtual (in Network RTK). Nonetheless, the inclusion of a reference station in the GNSS system increases operation cost and complexity. To receive reference data, a radio or wireless internet connection is included in the RTK rover receiver. But, the rover sometimes loses connectivity with the reference station, resulting in a reference data outage. For example, urban areas, canyons and mountainous regions have several obstacles that sometimes make wireless communications difficult, because radio signal may be blocked by building or mountains, or there may be a blind area for wireless internet connectivity such as in 3G, 4G, 5G or other types of wireless networks.

Without real-time reference data, RTK accuracy degrades because the correlation of error sources, between real-time rover measurements and aged reference data becomes weak. As reference data ages, the weaker correlation reduces the accuracy of the RTK position. Although the rover station is often capable of keeping centimeter-level accuracy during a reference data outage for several seconds, the accuracy quickly degrades to a decimeter-level as the reference data outage continues, at which point the rover station cannot provide RTK service anymore.

RTK is helpful when real-time centimeter-level positioning is needed for applications such as those involving surveying and mapping, precision agriculture, an unmanned aerial vehicle (UAV), a pilotless automobile, deformation monitoring, or other suitable application. Some applications require continuous real-time centimeter-level positioning, otherwise, the operation has to stop. For example, a spraying or seeding UAV, which is flying with a RTK receiver used for positioning, may have to return to a site of departure if RTK service is unavailable because of a RTK reference data outage. Similarly, a reaping or plowing tractor, which is directed by a RTK solution, may have to stop when RTK service is unavailable because a wireless communication by which reference data is received has been interrupted by the dynamics of the vehicle, interference of other devices, or the surrounding environment. Extending RTK service during a reference data outage could improve operation efficiency of RTK reliant devices dramatically.

While having the advantage of improved position determination results if the rover station uses reference data from reference stations and thus facilitating applications that need centimeter-level accuracy, the positioning accuracy relies on the permanent availability of the reference data. But, on remote construction sites or in agricultural applications providing the reference data at all times to a rover station may be difficult, causing a deterioration of the position determination during the times of reference data outage. Reduced position accuracy is not only undesirable and may cause a device reliant on RTK positioning to cease operation, but reduce positing accuracy may even be dangerous, for example in automatic positioning applications.

Sometimes satellite clock drifts are applied to extend RTK service during a reference data outage to mitigate positioning errors introduced by satellite clock drifts that cannot be compensated on the basis of the reference data due to the outage. Such satellite clock drifts, however, are not generated by the rover station, but instead are obtained from a wired or wireless communication, or from a satellite. Wired and wireless communication by which the rover station receives the clock drift data, however, sometimes fails during a reference data outage for similar reasons to those that caused the reference data outage, and event when clock drifts are obtained from a satellite, the satellite signal may also blocked by buildings or mountains, for example. On the other hand, satellite clock errors, which are caused by satellite clock drift, are only one of the error sources introduced by the outage of reference data. So, even when satellite clock errors are compensated for by clock drifts, the accuracy of RTK still degrades because of other error sources such as satellite orbit error, ionosphere error, troposphere error, and/or cycleslip.

Cycleslip is one of the biggest contributors to positioning errors in GNSS systems. Delta phase measurements and satellite clock drifts are used to calculate a position difference vector between a current instance in time and previous instance in time during a reference data outage, thus obtaining the current position of a rover station. But, once cycleslips happen between two instances in time (sometimes referred to as "epochs"), delta phase measurements are deteriorated by ambiguities and are no longer usable to calculate the position difference vector. As such, when cycleslip occurs, and there is a reference data outage, RTK service is usually not available anymore, even though satellite clock drift are still available.

FIG. 1 is a diagram of system 100, in accordance with one or more embodiments. In some embodiments, the system 100 helps to extend RTK service during reference data outage. System 100 comprises a rover station 101 that includes, or at least has connectivity to, a position determination platform 103 and a database 105. Rover station 101 has connectivity to a reference station 107 and one or more satellites 109a-109n (collectively referred to herein as "satellite 109").

The rover station 101, the position determination platform 103 and the database 105 are modular components of a special purpose computer system. In some embodiments, one or more of the rover station 101, the position determination platform 103, and the database 105 are unitarily embodied in the rover station 101. The rover station 101, accordingly, comprises a processor by which the position determination platform 103 is executed. In some embodiments, one or more of the rover station 101, the position determination platform 103 and/or the database 105 are configured to be located remotely from each other. By way of example, the rover station 101, the position determination platform 103 and/or the database 105 communicate by wired or wireless communication connection and/or one or more networks, or combination thereof. The rover station 101 communicates with reference station 107 by wired or wireless communication connection and/or one or more networks, or combination thereof. The rover station 101 communicates with one or more satellites 109 by wireless communication connection and/or one or more networks, or combination thereof. The reference station 107 communicates with one or more satellites 109 by wireless communication connection and/or one or more networks, or combination thereof.

The rover station 101 is a type of mobile terminal, fixed terminal, or portable terminal including a desktop computer, laptop computer, notebook computer, netbook computer, tablet computer, wearable circuitry, mobile handset, server, gaming console, or combination thereof. In some embodiments, rover station 101 is a position determining unit. In some embodiments, rover station 101 is a mobile unit, a mobile device, a hand held device or a positioning unit installed in a vehicle, such as a tractor for agricultural applications, UAV, construction vehicle, automobile, vehicles, ships, airplanes, or other suitable vessel.

Position determination platform 103 is a set of computer readable instructions that, when executed by a processor such as a processor 403 (FIG. 4), facilitates the connectivity between the rover station 101 and one or more of database 105, reference station 107 or satellites 109. In some embodiments, the position determination platform 103 causes information that describes one or more of the rover station 101, measurement results calculated by rover station 101 or position determination platform 103, reference data received from reference station 107, or other suitable information to be stored in the database 105. In some embodiments, position determination platform 103 is implemented by a computer remote from rover station 101. Database 105 is a memory such as a memory 405 (FIG. 4) capable of being queried or caused to store data associated with the rover station 101.

Position determination platform 103 is configured to enable rover station 101 to provide centimeter-level positional accuracy by way of RTK positioning based on positioning signals received from satellites 109, reference data received from reference station 107, and various measurements performed by position determination platform 103 to mitigate errors associated with at least one of a time dependent relativistic clock error, a time dependent satellite orbit error, a troposphere error, an ionosphere error, a multipath error, carrier noise, cycleslip, or other suitable, identifiable, or theoretical error source, even when a reference data outage occurs. Position determination platform 103 is configured to estimate and mitigate at least one of the error sources, thereby extending RTK service during a reference data outage. In some embodiments, position determination platform 103 is configured to resolve ambiguities in the event that cycleslip occurs.

Position determination platform 103 is configured to use the last centimeter-level accurate RTK coordinate determined by position determination platform 103 with real-time reference data and measurements as virtual reference data during a real reference data outage. In the subsequent epochs during the real reference data outage, the rover station 101 accomplishes the RTK process between a current epoch and the virtual reference data. Once the ambiguities are resolved, the coordinate of the current epoch is centimeter-level accurate relative to the virtual reference coordinate. Then the coordinate and observables of the current epoch are usable as new virtual reference data and so forth until real reference data recovers.

During a real reference data outage, rover station 101 is able to get centimeter-level, high accuracy, positions relative to the first virtual reference position for all of its trajectories.

As the first virtual reference coordinate is centimeter-level accurate with real reference data, all the trajectories during the real reference data outage are centimeter-level accurate also.

Position determination platform 103 is configured to switch from an RTK extension mode during the reference data outage to a normal RTK mode with real reference data once real reference data recovers. Upon real reference data recovery, there is almost no position jump between the position of the rover station 101 determined with virtual reference data and the position of the rover station 101 determined real reference data.

Position determination platform 103 is configured to save the coordinate, pseudo-range and carrier phase measurements of the last epoch before a reference data outage in database 105. Once reference data is lost, the last coordinate, estimated with real reference data, and measurements work as virtual reference data for the following epochs.

At a next epoch, the position determination platform 103 accomplishes the RTK process using current epoch measurements and the virtual reference data generated by the position determination platform 103 associated with rover station 101. If there are no cycleslips between the virtual reference data and current epoch data, all ambiguities are zero. If there are loss of lock or cycleslips for some carrier phases, position determination platform 103 performs ambiguity resolution (AR) during the RTK process.

Once the ambiguities are resolved, the coordinate of the current epoch is also centimeter-level accurate relative to the reference coordinate, which is calculated with real reference data. Then the coordinate and measurements of the ambiguity fixed epoch are saved in database 105 as new virtual reference data for future positioning. In some embodiments, position determination platform 103 discards old virtual reference data upon saving the new virtual reference data. Virtual reference data switches once ambiguities are resolved. For epochs whose ambiguities are known, the positions are all centimeter-level accurate relative to the first virtual reference position, which is calculated with real reference data and is centimeter-level accurate. Therefore the positions of all the ambiguity resolved epochs during reference data outage are also centimeter-level accurate.

The position determination platform 103 works similar to RTK with real reference data during a reference data outage, but the reference data is generated by the position determination platform 103 as opposition to relying on reference data received from the reference station 107. With ambiguity resolution, even if all satellites 109 lose tracking, the rover station 101 can still recover centimeter-level accurate positioning once achieving reacquisition.

Cycleslips are recovered by ambiguity resolution. Also, error sources, such as satellite orbit and clock errors, ionosphere and troposphere error, are estimated and mitigated by the position determination platform 103. Even if a reference data outage occurs for more than 10 minutes, kinematic positions are still centimeter-level accurate. In some embodiments, position determination platform 103 achieves the centimeter-level accurate positioning without other precise data such as satellite clock drift or Precise Point Positioning (PPP) corrections. Ionospheric effect can be mitigated using dual-frequency measurements. Tropospheric delay can be mitigated using models based on meteorological data. However, the residuals and orbit-clock errors still accumulate up to several decimeters.

In some embodiments, different from RTK with real reference data, position accuracy arises from double-differenced observable equations between measurements collected at the same epoch from two receivers at different locations. In some embodiments, position accuracy arises from double-differenced observable equations between measurements collected at different epochs from a standalone receiver. Resolution of double-differenced ambiguities involves addressing and mitigating error sources such as ionospheric effects, tropospheric delay, and satellite orbit errors, even though positional inaccuracy related to these error sources is very small after double-differencing. In other RTK systems, measurements of the reference station receiver and GNSS receiver, or rover station receiver, collect signals at the same time, eliminating satellite clock error as a source of positional error. In some embodiments, satellite clock error is a factor to consider when performing position determination because signals are measured at different epochs. Multipath errors correlate between epochs, and are nearly completely eliminated by single differencing between epochs. Carrier phase noise is also a very small, less than one millimeter. Residuals caused by multipath and carrier noise are white noise, not accumulated over time, and their contribution to position error is millimeter-level.

Error sources, such as satellite orbit and clock errors, accumulate slowly, normally less than one millimeter per second. After single differencing between epochs, which are sampled at least one time per second, the residuals are very small, often less than one millimeter. However, positional error caused by satellite orbit and clock errors accumulate over time. If errors are not dealt with correctly, positional error would accumulate up to the decimeter-level after ten minutes of time.

Atmospheric effects such as ionospheric effects and tropospheric delay are dependent on satellite elevation and change faster than orbit and clock errors. After modeling, for example, using a Klobuchar model for ionospheric effects, or a Saastamoinen model for troposphere delay, the residuals of double-differenced ionosphere and troposphere errors are very small, often less than one millimeter per second. Positional error caused by ionosphere and troposphere residuals accumulate over time. If these errors are not dealt with correctly, positional errors would accumulate up to the decimeter-level after ten minutes of time. In some embodiments, residuals are addressed by the position determination platform 103 to provide high performance.

The errors mentioned above can be split into dispersive error and geometric error. As the ionosphere is dispersive medium, ionospheric effects cause phase advance and pseudo-range group delay, and the effects are frequency square dependent. The dispersive error is ionospheric error. Satellite orbit error, clock error, and troposphere error are frequency independent, and as such are geometric errors. Geometric errors are the same for pseudo-range and carrier phase measurements of one satellite.

Position determination platform 103 mitigates error sources as follows. Ionosphere effects are modeled with a Klobuchar model at first and the double-differenced residual is estimated as a state called Ionosphere error. Tropospheric delay is modeled with a Saastamoinen model at first and the double-differenced residual is estimated together with double-differenced satellite orbit and clock residuals, as a state called geometric error.

In some embodiments, position determination platform 103 helps to provide centimeter-level accurate positioning without continuous tracking between epochs during a reference data outage. If the rover station 101 passes a bridge, a tunnel, or any other blockage, for example, the position determination platform 103 helps to recover centimeter-level accurate positioning once the rover station 101 achieves reacquisition by accomplishing RTK process between the epoch before loss of track and the epoch after reacquisition. Position determination platform 103 is, therefore, capable of extending RTK service for any scenario.

Rover station 101 is a GNSS receiver, which works as the RTK rover, and is configured to track satellites from one or more of GPS, GLONASS, BDS, Galileo, QZSS, or IRNSS, or other suitable system. In some embodiments, rover station 101 is a single-frequency receiver. In some embodiments, rover station 101 is a multiple-frequency receiver configured to receive a single frequency, a dual-frequency, a triple-frequency or some other quantity of frequencies for calculating pseudo-range and carrier phase measurements.

When reference data is available, the position determination platform 103 performs RTK process with reference data and calculates measurements. At any time, the rover station 101 cannot receive reference data anymore, the rover station 101 uses the last coordinate which was estimated with real reference data and the measurements of the last epoch, namely epoch m, as virtual reference data for the following epoch to accomplish the RTK process, thus extending RTK service during a reference data outage.

Position determination platform 103 calculates the following measurements at epoch m which are used as virtual reference data:

$$P^i_{m,k} = \rho^i_m + c \cdot (dT_{r,m} - dt^i_{s,m}) + Orb^i_m + Trop^i_m + \frac{f_1^2}{f_m^2} Iono^i_m + v^i_k \quad (1)$$

$$\Phi^i_{m,k} = \rho^i_m + c \cdot (dT_{r,m} - dt^i_{s,m}) + Orb^i_m + Trop^i_m - \frac{f_1^2}{f_k^2} Iono^i_m + \lambda_k N^i_{m,k} + \varepsilon^i_k \quad (2)$$

where:

$P_{m,k}^i$ is pseudo-range measurement of frequency k for satellite i at epoch m;

$\rho_m^i$ is geometric distance between satellite i and antenna phase center at epoch m;

c is speed of light in vacuum;

$dT_{r,m}$ is receiver clock error at epoch m;

$dt_{s,m}^i$ is satellite i clock error at epoch m;

$Orb_m^i$ is satellite i orbit error at epoch m;

$Trop_m^i$ is satellite i troposphere error at epoch m;

$Iono_m^i$ is satellite i ionosphere error at epoch m;

$f_1^2$ and $f_k^2$ are the square of frequency L1 and Lk, respectively, k may be 1, 2 or 3;

$v_k^i$ is multipath and noise of frequency k pseudo-range;

$\Phi_{m,k}^i$ is carrier phase measurement of frequency k for satellite i at epoch m;

$\lambda_k$ is wavelength of frequency k;

$N_{m,k}^i$ is integer ambiguity of frequency k for satellite i at epoch m;

$\varepsilon_k^i$ is multipath and noise of frequency k carrier phase.

Position determination platform 103 calculates the following measurements at epoch n, which are used as rover data:

$$P^i_{n,k} = \rho^i_n + c \cdot (dT_{r,n} - dt^i_{s,n}) + Orb^i_n + Trop^i_n + \frac{f_1^2}{f_n^2} Iono^i_n + v^i_k \quad (3)$$

$$\Phi^i_{n,k} = \rho^i_n + c \cdot (dT_{r,n} - dt^i_{s,n}) + Orb^i_n + Trop^i_n - \frac{f_1^2}{f_k^2} Iono^i_n + \lambda_k N^i_{n,k} + \varepsilon^i_k \quad (4)$$

where n indicates epoch n. n is not necessary to be m+1. Epoch n can be any epoch after epoch m.

After performing a single-difference between epoch m and n, and then another single-difference between satellite i and j, position determination platform 103 calculates the following double-differenced measurements:

$$\nabla \Delta P_{mn,k}^{ij} = \nabla \Delta \rho_{mn}^{ij} + \nabla \Delta Orb_{mn}^{ij} - c \cdot \nabla \Delta dt_{s,mn}^{ij} + \nabla \Delta Trop_{mn}^{ij} + \frac{f_1^2}{f_k^2} \nabla \Delta Iono_{mn}^{ij} + \nabla \Delta v_k^{ij} \quad (5)$$

$$\nabla \Delta \Phi_{mn,k}^{ij} = \nabla \Delta \rho_{mn}^{ij} + \nabla \Delta Orb_{mn}^{ij} - c \cdot \nabla \Delta dt_{s,mn}^{ij} + \nabla \Delta Trop_{mn}^{ij} - \frac{f_1^2}{f_k^2} \nabla \Delta Iono_{mn}^{ij} + \lambda_k \nabla \Delta N_{mn,k}^{ij} + \nabla \Delta \varepsilon_k^{ij} \quad (6)$$

where:
$\Delta$ is a single difference operator between epoch m and n;
$\nabla$ is a single difference operator between satellite i and j;
$\nabla \Delta P_{mn,k}^{ij}$ is double-differenced pseudo-range measurement of frequency k;
$\nabla \Delta \rho_{mn}^{ij}$ is double-differenced geometric distance;
$\nabla \Delta dt_{s,mn}^{ij}$ is double-differenced satellite clock residual;
$\nabla \Delta Orb_{mn}^{ij}$ is double-differenced satellite orbit residual;
$\nabla \Delta Trop_{mn}^{ij}$ is double-differenced troposphere residual;
$\nabla \Delta Iono_{mn}^{ij}$ is double-differenced ionosphere residual;
$\nabla \Delta v_k^{ij}$ is double-differenced multipath residual and noise of frequency k pseudo-range;
$\nabla \Delta \Phi_{mn,k}^{ij}$ is double-differenced carrier phase measurement of frequency k;
$\nabla \Delta N_{mn,k}^{ij}$ is double-differenced integer ambiguity of frequency k;
$\nabla \Delta \varepsilon_k^{ij}$ is double-differenced multipath residual and noise of frequency k carrier phase.

Position determination platform 103 is configured to model the ionosphere and troposphere errors before double-differencing, using Klobuchar and Saastamoinen models, respectively. The double-differenced ionosphere residual is frequency square dependent and is a different sign for pseudo-range and carrier phase. However, double-differenced troposphere residual, satellite orbit residual and satellite clock residual are frequency independent and is the same sign for pseudo-range and carrier phase. All three types of residuals change slowly with time. Position determination platform 103 calculates the following measurements as one state, namely $\nabla \Delta d_{geo}^{ij}$.

Where:

$$\nabla \Delta d_{geo}^{ij} = \nabla \Delta Orb_{mn}^{ij} - c \cdot \nabla \Delta dt_{s,mn}^{ij} + \nabla \Delta Trop_{mn}^{ij} \quad (7)$$

Then Equation (5) and (6) can be expressed as:

$$\nabla \Delta P_{mn,k}^{ij} = \nabla \Delta \rho_{mn}^{ij} + \nabla \Delta d_{geo}^{ij} + \frac{f_1^2}{f_k^2} \nabla \Delta Iono_{mn}^{ij} + \nabla \Delta v_k^{ij} \quad (8)$$

$$\nabla \Delta \Phi_{mn,k}^{ij} = \nabla \Delta \rho_{mn}^{ij} + \nabla \Delta d_{geo}^{ij} - \frac{f_1^2}{f_k^2} \nabla \Delta Iono_{mn}^{ij} + \lambda_k \nabla \Delta N_{mn,k}^{ij} + \nabla \Delta \varepsilon_k^{ij} \quad (9)$$

Position determination platform 103 calculates the states with a Kalman filter using double-differenced pseudo-range and carrier phase measurements. The state vector is shown in Table 1. The L1 measurements are GPS L1, GLONASS G1, BDS B1, Galileo E1, or QZSS L1, or other suitable source. The L2 measurements are GPS L2, GLONASS G2, BDS B2, Galileo E5b, QZSS L2, or other suitable source. The L3 measurements can be GPS L5, BDS B3, Galileo E5a, QZSS L5, IRNSS L5, or other suitable source.

TABLE 1

Kalman Filter State Vector

| States | Dimension | Notes |
| --- | --- | --- |
| Position component X | 1 | Mandatory |
| Position component Y | 1 | Mandatory |
| Position component Z | 1 | Mandatory |
| Double-differenced ionosphere residuals | Nsat-1 | Mandatory |
| Double-differenced geometry residuals | Nsat-1 | Mandatory |
| Double-differenced L1 ambiguities | Nsat-1 | If L1 measurement available |
| Double-differenced L2 ambiguities | Nsat-1 | If L2 measurement available |
| Double-differenced L3 ambiguities | Nsat-1 | If L3 measurement available |

In some embodiments, one or more of the position components X, Y and Z are modeled as random walk processes; the double-differenced ionosphere residuals are modeled as first-order Gauss-Markov processes; the double-differenced geometry residuals, which include double-differenced troposphere residuals, and double-differenced satellite orbit and clock residuals, are modeled as a first-order Gauss-Markov process; or the double-differenced L1 ambiguity, L2 ambiguity, and L3 ambiguity, if available, are estimated as constants. In some embodiments, even if the rover station 101 can track triple-frequency signals, interference may lead to loss of track at any frequency, position determination platform 103 is configured such that measurements from any frequency can be used in a Kalman Filter independently.

If there are no cycleslips between epoch m, which works as reference, and n, which works as rover, all ambiguities are zero. No ambiguity resolution is required in this case. So, when the rover station 101 passes a bridge, foliage, or urban canyon, for example, loss of track and reacquisition may happen for some or even all satellites 109. In this case, ambiguities are non-zero float values. Float ambiguities have to be fixed to get centimeter-level accuracy relative to the reference coordinate. In some embodiments, position determination platform 103 applies a least-squares ambiguity decorrelation (LAMBDA) method for ambiguity resolution. Once the float ambiguities are fixed, the current epoch coordinate is centimeter-level accurate relative to the reference coordinate. In some embodiments, several epochs are used to resolve the ambiguities. Old reference data is used until all ambiguities are known, meaning that all ambiguities are zero or non-zero but fixed integer.

Once all ambiguities are known, position determination platform 103 switches the reference data to the current epoch, and so forth. The differential age between reference and rover is kept small, normally one second, or several seconds if most satellites 109 experience a loss of track. The smaller the differential age, the stronger correlation between reference and rover measurements, the smaller geometry residuals and ionosphere residuals remain in the double-differenced function models. For all epochs whose ambiguities are resolved, their coordinates are centimeter-level accurate relative to the initial virtual reference coordinate. Because the initial virtual reference coordinate is estimated with real reference coordinates at centimeter-level accuracy, the absolute accuracy of all the following epochs is also centimeter-level accurate.

By extending RTK service in the event of a reference data outage, position determination platform 103 and/or rover station 101 helps to facilitate continuous real-time centimeter-level positioning capabilities where RTK is used, and/or where an operation would otherwise be forced to stop if centimeter-level accurate positioning is not available and such a high-level of positioning is relied upon for the operation to be occur.

Figure 2:
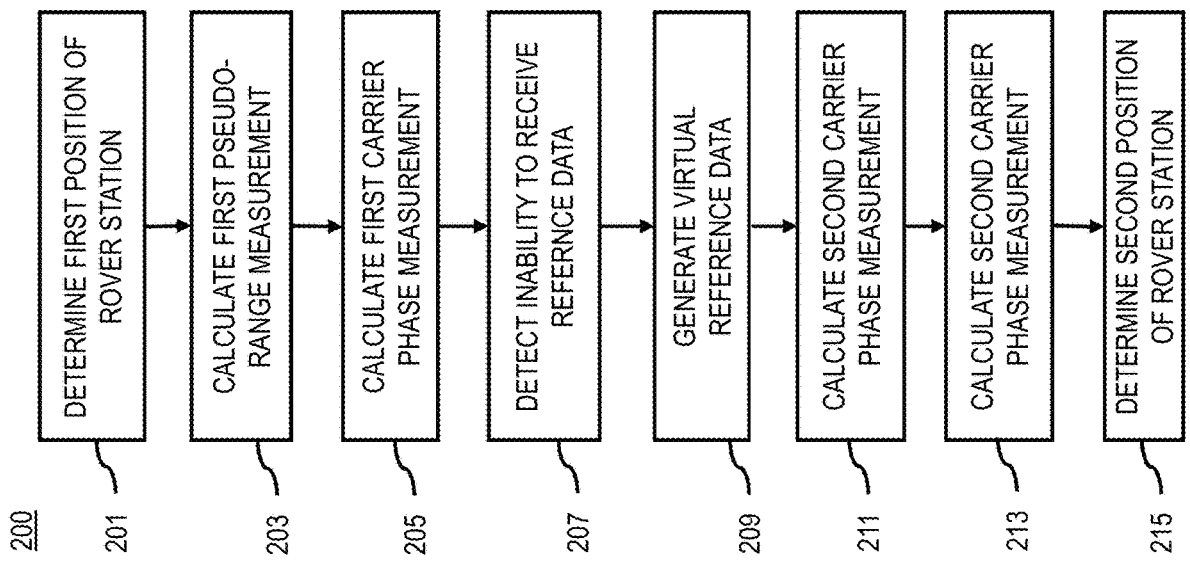
FIG. 2 is a flow chart of a method of extending RTK service, in accordance with one or more embodiments.

FIG. 2 is a flow chart of a method 200 of extending RTK service, in accordance with one or more embodiments. In some embodiments, method 200 is performed by at least one processor. In some embodiments, method 200 is performed by position determination platform 103 (FIG. 1).

In step 201, reference data received from at least one reference station and positioning signals received from one or more positioning satellites are processed to determine a first position of the rover station for a first instance in time.

In step 203, a first pseudo-range measurement of a frequency is calculated for at least one positioning satellite of the one or more positioning satellites for the first instance in time. The first pseudo-range measurement is a duration of time taken for data communicated in a positioning signal to travel from the at least one positioning satellite to the rover station for the first instance in time.

In step 205, a first carrier phase measurement of the frequency is calculated for the at least one positioning satellite of the one or more positioning satellites for the first instance in time. The first carrier phase measurement is a transit time difference as determined by a time the positioning signal left the at least one positioning satellite according to a satellite clock and a time the positioning signal arrived at the rover station according to a receiver clock for the first instance in time.

In step 207, an inability to receive the reference data from the at least one reference station is detected.

In step 209, virtual reference data is generated. The virtual reference data is based on the reference data, the first position of the rover station, the first pseudo-range measurement of the frequency, and the first carrier phase measurement of the frequency. In some embodiments, the virtual reference data is generated based on the detected inability to receive the reference data from the at least one reference station.

In step 211, a second pseudo-range measurement of the frequency is calculated for the at least one positioning satellite of the one or more positioning satellites for a second instance in time subsequent to the first instance in time. The second pseudo-range measurement is a duration of time taken for data communicated in a positioning signal to travel from the at least one positioning satellite to the rover station for the second instance in time.

In step 213, a second carrier phase measurement of the frequency is calculated for the at least one positioning satellite of the one or more positioning satellites for the second instance in time. The second carrier phase measurement is a transit time difference as determined by a time the positioning signal left the at least one positioning satellite according to the satellite clock and a time the positioning signal arrived at the rover station according to the receiver clock for the second instance in time.

In some embodiments, calculating the first pseudo-range measurement of a frequency, calculating the first carrier phase measurement of the frequency, calculating the second pseudo-range measurement of the frequency, and calculating the second carrier phase measurement of the frequency each takes one or more errors into account as a part of the corresponding calculation. In some embodiments, at least one of the one or more errors includes at least one of a time dependent relativistic clock error, a time dependent satellite orbit error, a troposphere error, an ionosphere error, a multipath error, carrier noise, or cycleslip.

In step 215, the virtual reference data, the positioning signals received from the one or more positioning satellites for the second instance in time, the second pseudo-range measurement of the frequency and the second carrier phase measurement of the frequency are processed, based on the detected inability to receive the reference data, to determine a second position of the rover station for the second instance in time.

In some embodiments, step 215 comprises single differencing values calculated for the first instance in time and values calculated for the second instance in time. In some embodiments, the one or more positioning satellites comprises at least two positioning satellites, and step 215 comprises single differencing values calculated for the first instance in time and values calculated for the second instance in time that are calculated for each of the at least two positioning satellites. In some embodiments, step 215 comprises double differencing values calculated for the first instance in time and values calculated for the second instance in time that are calculated for each of the at least two positioning satellites to generate a double differenced pseudo-range measurement of the frequency and a double differenced carrier phase measurement of the frequency. In some embodiments, the troposphere error and the ionosphere error are modeled before the double differencing. In some embodiments, the ionosphere error is modeled using a Klobuchar model. In some embodiments, the troposphere error is modeled using a Saastamoinen model. In some embodiments, step 215 comprises resolving ambiguities associated with the cycleslip. In some embodiments, step 215 comprises estimating at least one state vector with a Kalman filter using the double differenced pseudo-range measurement for the frequency and the double differenced carrier phase measurement for the frequency.

Figure 3:
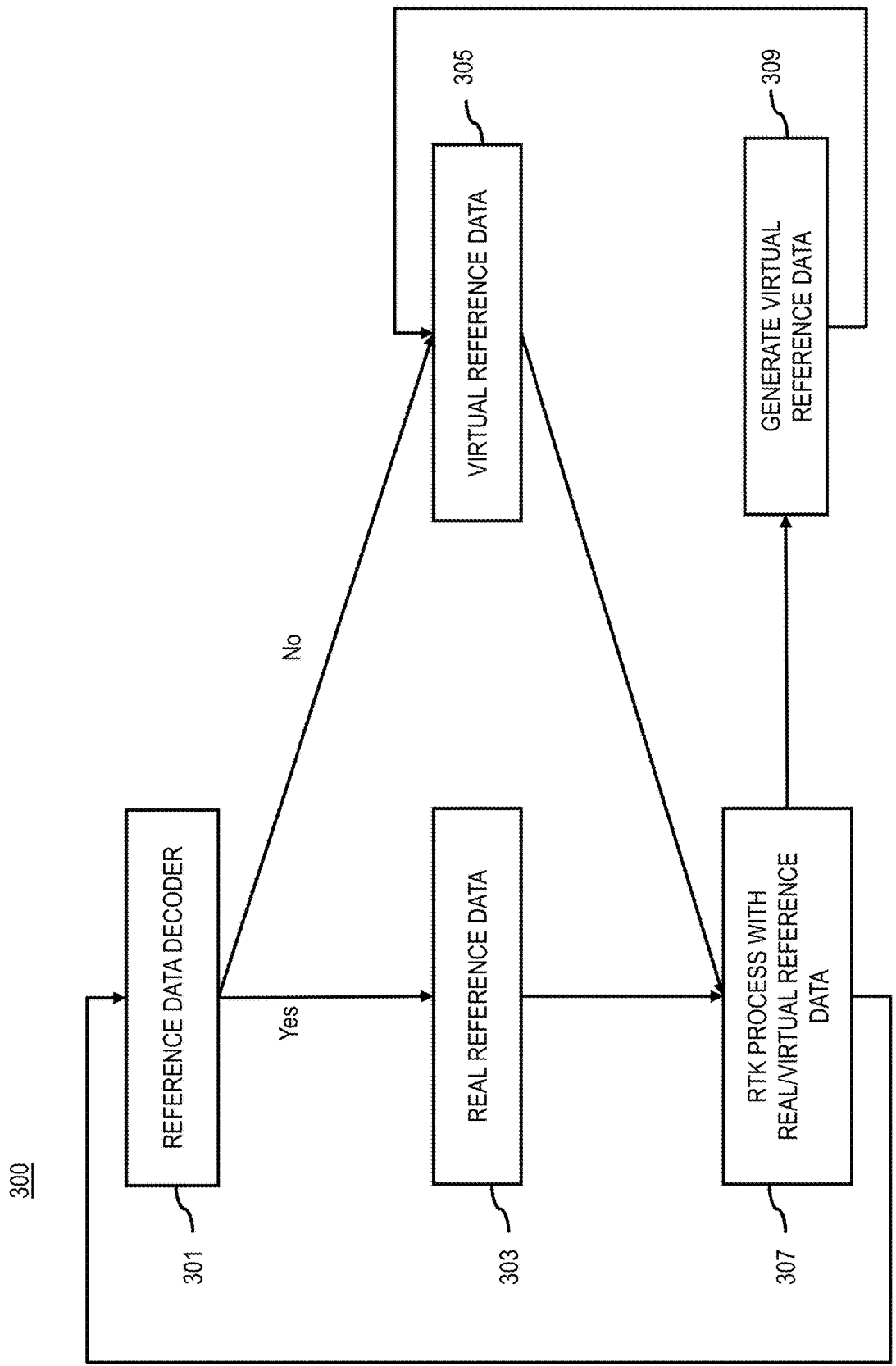
FIG. 3 is a flow chart of a method of a switching process for extending RTK service and returning to a normal RTK mode based on a determination of whether real reference data is available, in accordance with one or more embodiments.

FIG. 3 is a flow chart of a method 300 of a switching process for extending RTK service and returning to a normal RTK mode based on a determination of whether real reference data is available, in accordance with one or more embodiments. In some embodiments, method 300 is performed by at least one processor. In some embodiments, method 300 is performed by position determination platform 103 (FIG. 1).

In some embodiments, a switching occurs between using real reference data in a normal RTK mode when real reference data is available to using virtual data in an RTK extension mode during a reference data outage and back to a normal RTK mode using real reference data once real reference data recovers. Upon real reference data recovery, there is almost no position jump between the position of the rover station determined with virtual reference data and the position of the rover station determined real reference data.

In step 301, a determination is made by a reference data decoder regarding whether real reference data is available from at least one reference station.

If the real reference data is available, the method proceeds to step 303. If the real reference data is unavailable, the method proceeds to step 305.

In step 303, the real reference data is designated to be used for determining the position of the rover.

In step 305, the virtual reference data is designated to be used for determining the position of the rover.

In step 307, the real reference data is processed to determine a position of the rover station for a corresponding instance in time.

In step 309, virtual reference data is generated. The virtual reference data is based, at least in part, on previously received real reference data and/or the position of the rover station determined based on the previously received real reference data.

Returning to step 305, the virtual reference data having been designated for usage in determining the position of the rover station and having been generated is then used in step 307 to determine the position of the rover station for an instance in time when real reference data is unavailable.

In some embodiments, during or subsequent to a processing of the real reference data or the virtual reference data in step 307, step 307 further comprises switching to use the other of the real reference data or the virtual reference data for determining the position of the rover at a next corresponding instance in time based on the designation of whether real reference data or virtual reference data is to be used for that next corresponding instance in time.

In some embodiments, upon determining the position of the rover station for a particular instance in time, based on the real reference data or based on the virtual reference data, method 300 returns to step 301 and repeats to maintain RTK service using either the real reference data or the virtual reference data and switching between using the real reference data and virtual reference data, as needed, based on a determination of whether real reference data is available. In some embodiments, method 300 returns to step 301 during the processing of the real reference data or the virtual reference data to determine the position of the rover station so that usage of the real reference data or the virtual reference data is designated for a next corresponding instance in time prior to determining the position of the rover station for the particular instance in time using whichever of the real reference data or the virtual reference data has been designated for use in the position determination. In some embodiments, two or more of steps 301, 303, 305, 307 or 309 occur simultaneously.

Figure 4:
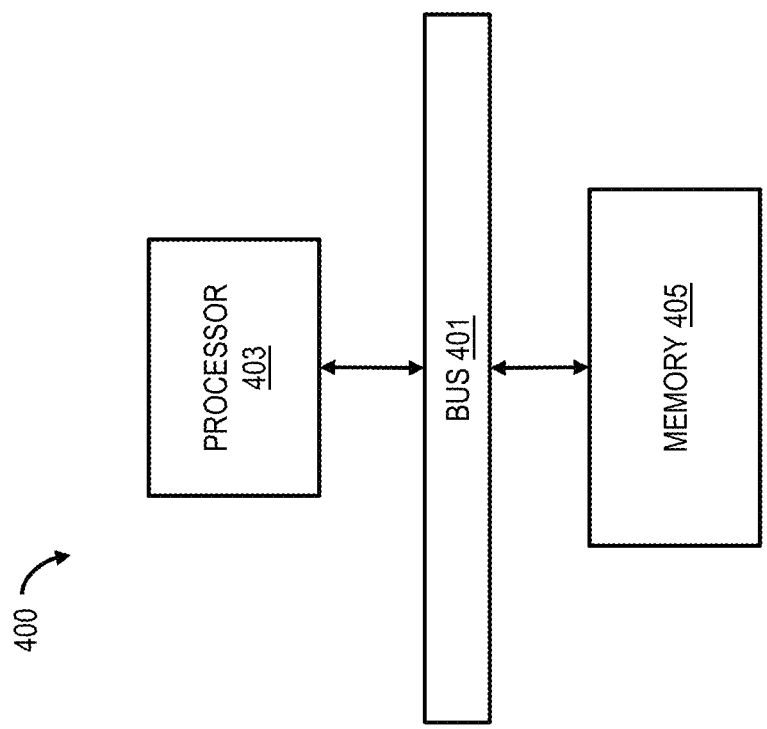
FIG. 4 is a functional block diagram of a computer or processor-based system upon which or by which some embodiments are implemented.

FIG. 4 is a functional block diagram of a computer or processor-based system 400 upon which or by which an embodiment is implemented.

Processor-based system 400 is programmed to extend RTK service, as described herein, and includes, for example, bus 401, processor 403, and memory 405 components.

In some embodiments, the processor-based system is implemented as a single "system on a chip." Processor-based system 400, or a portion thereof, constitutes a mechanism for performing one or more steps of.

In some embodiments, the processor-based system 400 includes a communication mechanism such as bus 401 for transferring information and/or instructions among the components of the processor-based system 400. Processor 403 is connected to the bus 401 to obtain instructions for execution and process information stored in, for example, the memory 405. In some embodiments, the processor 403 is also accompanied with one or more specialized components to perform certain processing functions and tasks such as one or more digital signal processors (DSP), or one or more application-specific integrated circuits (ASIC). A DSP typically is configured to process real-world signals (e.g., sound) in real time independently of the processor 403. Similarly, an ASIC is configurable to perform specialized functions not easily performed by a more general purpose processor. Other specialized components to aid in performing the functions described herein optionally include one or more field programmable gate arrays (FPGA), one or more controllers, or one or more other special-purpose computer chips.

In one or more embodiments, the processor (or multiple processors) 403 performs a set of operations on information as specified by a set of instructions stored in memory 405 related to extend RTK service. The execution of the instructions causes the processor to perform specified functions.

The processor 403 and accompanying components are connected to the memory 405 via the bus 401. The memory 405 includes one or more of dynamic memory (e.g., RAM, magnetic disk, writable optical disk, etc.) and static memory (e.g., ROM, CD-ROM, etc.) for storing executable instructions that when executed perform the steps described herein to extend RTK service. The memory 405 also stores the data associated with or generated by the execution of the steps.

In one or more embodiments, the memory 405, such as a random access memory (RAM) or any other dynamic storage device, stores information including processor instructions for extending RTK service. Dynamic memory allows information stored therein to be changed by system 100. RAM allows a unit of information stored at a location called a memory address to be stored and retrieved independently of information at neighboring addresses. The memory 405 is also used by the processor 403 to store temporary values during execution of processor instructions. In various embodiments, the memory 405 is a read only memory (ROM) or any other static storage device coupled to the bus 401 for storing static information, including instructions, that is not changed by the system 100. Some memory is composed of volatile storage that loses the information stored thereon when power is lost. In some embodiments, the memory 405 is a non-volatile (persistent) storage device, such as a magnetic disk, optical disk or flash card, for storing information, including instructions, that persists even when the system 100 is turned off or otherwise loses power.

The term "computer-readable medium" as used herein refers to any medium that participates in providing information to processor 403, including instructions for execution. Such a medium takes many forms, including, but not limited to computer-readable storage medium (e.g., non-volatile media, volatile media). Non-volatile media includes, for example, optical or magnetic disks. Volatile media include, for example, dynamic memory. Common forms of computer-readable media include, for example, a floppy disk, a flexible disk, a hard disk, a magnetic tape, another magnetic medium, a CD-ROM, CDRW, DVD, another optical medium, punch cards, paper tape, optical mark sheets, another physical medium with patterns of holes or other optically recognizable indicia, a RAM, a PROM, an EPROM, a FLASH-EPROM, an EEPROM, a flash memory, another memory chip or cartridge, or another medium from which a computer can read. The term computer-readable storage medium is used herein to refer to a computer-readable medium.

An aspect of this description relates to a method performed by a processor included in a rover station, wherein the method comprises processing reference data received from at least one reference station and positioning signals received from one or more positioning satellites to determine a first position of the rover station for a first instance in time. The method also comprises calculating a first pseudo-range measurement of a frequency for at least one positioning satellite of the one or more positioning satellites for the first instance in time, the first pseudo-range measurement being a duration of time taken for data communicated in a positioning signal to travel from the at least one positioning satellite to the rover station for the first instance in time. The method further comprises calculating a first carrier phase measurement of the frequency for the at least one positioning satellite of the one or more positioning satellites for the first instance in time, the first carrier phase measurement being a transit time difference as determined by a time the positioning signal left the at least one positioning satellite according to a satellite clock and a time the positioning signal arrived at the rover station according to a receiver clock for the first instance in time. The method additionally comprises detecting an inability to receive the reference data from the at least one reference station. The method also comprises generating virtual reference data, the virtual reference data being based on the reference data, the first position of the rover station, the first pseudo-range measurement of the frequency, and the first carrier phase measurement of the frequency. The method further comprises calculating a second pseudo-range measurement of the frequency for the at least one positioning satellite of the one or more positioning satellites for a second instance in time subsequent to the first instance in time, the second pseudo-range measurement being a duration of time taken for data communicated in a positioning signal to travel from the at least one positioning satellite to the rover station for the second instance in time. The method additionally comprises calculating a second carrier phase measurement of the frequency for the at least one positioning satellite of the one or more positioning satellites for the second instance in time, the second carrier phase measurement being a transit time difference as determined by a time the positioning signal left the at least one positioning satellite according to the satellite clock and a time the positioning signal arrived at the rover station according to the receiver clock for the second instance in time. The method also comprises processing the virtual reference data, the positioning signals received from the one or more positioning satellites for the second instance in time, the second pseudo-range measurement of the frequency and the second carrier phase measurement of the frequency, based on the detected inability to receive the reference data, to determine a second position of the rover station for the second instance in time.

Another aspect of this description relates to an apparatus that comprises a processor and at least one non-transitory computer readable medium having computer-executable instructions stored thereon that, when executed by the processor, cause the apparatus to process reference data received from at least one reference station and positioning signals received from one or more positioning satellites to determine a first position of a rover station for a first instance in time. The apparatus is also caused to calculate a first pseudo-range measurement of a frequency for at least one positioning satellite of the one or more positioning satellites for the first instance in time, the first pseudo-range measurement being a duration of time taken for data communicated in a positioning signal to travel from the at least one positioning satellite to the rover station for the first instance in time. The apparatus is further caused to calculate a first carrier phase measurement of the frequency for the at least one positioning satellite of the one or more positioning satellites for the first instance in time, the first carrier phase measurement being a transit time difference as determined by a time the positioning signal left the at least one positioning satellite according to a satellite clock and a time the positioning signal arrived at the rover station according to a receiver clock for the first instance in time. The apparatus is additionally caused to detect an inability to receive the reference data from the at least one reference station. The apparatus is also caused to generate virtual reference data, the virtual reference data being based on the reference data, the first position of the rover station, the first pseudo-range measurement of the frequency, and the first carrier phase measurement of the frequency. The apparatus is further caused to calculate a second pseudo-range measurement of the frequency for the at least one positioning satellite of the one or more positioning satellites for a second instance in time subsequent to the first instance in time, the second pseudo-range measurement being a duration of time taken for data communicated in a positioning signal to travel from the at least one positioning satellite to the rover station for the second instance in time. The apparatus is additionally caused to calculate a second carrier phase measurement of the frequency for the at least one positioning satellite of the one or more positioning satellites for the second instance in time, the second carrier phase measurement being a transit time difference as determined by a time the positioning signal left the at least one positioning satellite according to the satellite clock and a time the positioning signal arrived at the rover station according to the receiver clock for the second instance in time. The apparatus is also caused to process the virtual reference data, the positioning signals received from the one or more positioning satellites for the second instance in time, the second pseudo-range measurement of the frequency and the second carrier phase measurement of the frequency, based on the detected inability to receive the reference data, to determine a second position of the rover station for the second instance in time.

A further aspect of this description relates to a mobile device comprising a processor and at least one non-transitory computer readable medium having computer-executable instructions stored thereon that, when executed by the processor, cause the mobile device to process reference data received from at least one reference station and positioning signals received from at least two positioning satellites to determine a first position of a mobile device for a first instance in time. The mobile device is also caused to calculate a first pseudo-range measurement of a frequency for at least one positioning satellite of the at least two positioning satellites for the first instance in time, the first pseudo-range measurement being a duration of time taken for data communicated in a positioning signal to travel from the at least one positioning satellite to the mobile device for the first instance in time. The mobile device is further caused to calculate a first carrier phase measurement of the frequency for the at least one positioning satellite of the at least two positioning satellites for the first instance in time, the first carrier phase measurement being a transit time difference as determined by a time the positioning signal left the at least one positioning satellite according to a satellite clock and a time the positioning signal arrived at the mobile device according to a receiver clock for the first instance in time. The mobile device is additionally caused to detect an inability to receive the reference data from the at least one reference station. The mobile device is also caused to generate virtual reference data, the virtual reference data being based on the reference data, the first position of the mobile device, the first pseudo-range measurement of the frequency, and the first carrier phase measurement of the frequency. The mobile device is further caused to calculate a second pseudo-range measurement of the frequency for the at least one positioning satellite of the at least two positioning satellites for a second instance in time subsequent to the first instance in time, the second pseudo-range measurement being a duration of time taken for data communicated in a positioning signal to travel from the at least one positioning satellite to the mobile device for the second instance in time. The mobile device is additionally caused to calculate a second carrier phase measurement of the frequency for the at least one positioning satellite of the at least two positioning satellites for the second instance in time, the second carrier phase measurement being a transit time difference as determined by a time the positioning signal left the at least one positioning satellite according to the satellite clock and a time the positioning signal arrived at the mobile device according to the receiver clock for the second instance in time. The mobile device is also caused to process the virtual reference data, the positioning signals received from the one or more positioning satellites for the second instance in time, the second pseudo-range measurement of the frequency and the second carrier phase measurement of the frequency, based on the detected inability to receive the reference data, to determine a second position of the mobile device for the second instance in time, taking one or more errors into account as a part of the corresponding calculation when calculating the first pseudo-range measurement of a frequency, calculating the first carrier phase measurement of the frequency, calculating the second pseudo-range measurement of the frequency, and calculating the second carrier phase measurement of the frequency by single differencing values calculated for the first instance in time and values calculated for the second instance in time; single differencing values calculated for the first instance in time and values calculated for the second instance in time that are calculated for each of the at least two positioning satellites; double differencing values calculated for the first instance in time and values calculated for the second instance in time that are calculated for each of the at least two positioning satellites to generate a double differenced pseudo-range measurement of the frequency and a double differenced carrier phase measurement of the frequency; and estimating at least one state vector with a Kalman filter using the double differenced pseudo-range measurement for the frequency and the double differenced carrier phase measurement for the frequency to mitigate at least one of the one or more errors.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method performed by a processor included in a rover station, the method comprising:
   processing a first reference data received from at least one reference station and positioning signals received from one or more positioning satellites to determine a first position of the rover station for a first instance in time;
   generating a first rover data by:
     calculating a first pseudo-range time measurement of a frequency for at least one positioning satellite of the one or more positioning satellites for the first instance in time, the first pseudo-range time measurement being a duration of time taken for data communicated in a positioning signal to travel from the at least one positioning satellite to the rover station for the first instance in time; and
     calculating a first carrier phase time measurement of the frequency for the at least one positioning satellite of the one or more positioning satellites for the first instance in time, the first carrier phase time measurement being a transit time difference as determined by a time the positioning signal left the at least one positioning satellite according to a satellite clock and a time the positioning signal arrived at the rover station according to a receiver clock for the first instance in time;
   detecting an inability to receive a second reference data from the at least one reference station;
   generating virtual reference data by the rover station, the virtual reference data being based on the first rover data generated by the rover station at the first instance in time and the first position of the rover station at the first instance in time;
   generating a second rover data by:
     calculating a second pseudo-range time measurement of the frequency for the at least one positioning satellite of the one or more positioning satellites for a second instance in time subsequent to the first instance in time, the second pseudo-range time measurement being a duration of time taken for data communicated in a positioning signal to travel from the at least one positioning satellite to the rover station for the second instance in time; and
     calculating a second carrier phase time measurement of the frequency for the at least one positioning satellite of the one or more positioning satellites for the second instance in time, the second carrier phase time measurement being a transit time difference as determined by a time the positioning signal left the at least one positioning satellite according to the satellite clock and a time the positioning signal arrived at the rover station according to the receiver clock for the second instance in time;
   processing the virtual reference data, the positioning signals received from the one or more positioning satellites for the second instance in time, the second pseudo-range time measurement of the frequency and the second carrier phase time measurement of the frequency, based on the detected inability to receive the second reference data from the at least one reference station, to determine a second position of the rover station for the second instance in time;
   performing an ambiguity resolution in response to a loss of lock or cycleslips between the virtual reference data at the first instance in time and the second rover data generated by the rover station at the second instance in time; and
   generating an updated virtual reference data for future positioning based on an ambiguity fixed second rover data and second position of the rover station,
   wherein the virtual reference data is generated from the first reference data based on:

$$P_{m,k}^i = \rho_m^i + c \cdot (dT_{r,m} - dt_{s,m}^i) + Orb_m^i + Trop_m^i + \frac{f_1^2}{f_m^2} Iono_m^i + v_k^i,$$

$$\Phi_{m,k}^i = \rho_m^i + c \cdot (dT_{r,m} - dt_{s,m}^i) + Orb_m^i + Trop_m^i - \frac{f_1^2}{f_k^2} Iono_m^i + \lambda_k N_{m,k}^i + \varepsilon_k^i,$$

where
   $P_{m,k}^i$ is a pseudo-range time measurement of a frequency k for a satellite i at epoch m;
   $\rho_m^i$ is a geometric distance between the satellite i and an antenna phase center at epoch m;
   c is a speed of light in vacuum;
   $dT_{r,m}$ is a receiver clock error at epoch m;
   $dt_{s,m}^i$ is a satellite i clock error at epoch m;

$Orb_m^i$ is a satellite i orbit error at epoch m;
$Trop_m^i$ is a satellite i troposphere error at epoch m;
$Iono_m^i$ is a satellite i ionosphere error at epoch m;
$f_1^2$ and $f_k^2$ are square of frequencies Ll and Lk, respectively, k may be 1, 2 or 3;
$v_k^i$ is a multipath and noise of the frequency k pseudo-range;
$\Phi_{m,k}^i$ is carrier phase measurement of frequency k for satellite i at epoch m;
$\lambda_k$ is wavelength of frequency k;
$N_{m,k}^i$ is integer ambiguity of frequency k for satellite i at epoch m; and
$\varepsilon_k^i$ is multipath and noise of frequency k carrier phase.

2. The method of claim 1, wherein calculating the first pseudo-range time measurement of the frequency, calculating the first carrier phase measurement of the frequency, calculating the second pseudo-range time measurement of the frequency, and calculating the second carrier phase time measurement of the frequency each takes one or more errors into account as a part of the corresponding calculation.

3. The method of claim 2, wherein at least one of the one or more errors includes at least one of a time dependent relativistic clock error, a time dependent satellite orbit error, a troposphere error, an ionosphere error, a multipath error, carrier noise, or cycleslip.

4. The method of claim 3, wherein processing the virtual reference data, the positioning signals received from the one or more positioning satellites for the second instance in time, the second pseudo-range time measurement of the frequency and the second carrier phase time measurement of the frequency, based on the detected inability to receive the second reference data, to determine the second position of the rover station for the second instance in time, comprises:
single differencing values calculated for the first instance in time and values calculated for the second instance in time.

5. The method of claim 4, wherein the one or more positioning satellites comprises at least two positioning satellites, and processing the virtual reference data, the positioning signals received from the one or more positioning satellites for the second instance in time, the second pseudo-range time measurement of the frequency and the second carrier phase time measurement of the frequency, based on the detected inability to receive the second reference data, to determine the second position of the rover station for the second instance in time, comprises:
single differencing values calculated for the first instance in time and values calculated for the second instance in time that are calculated for each of the at least two positioning satellites.

6. The method of claim 5, wherein processing the virtual reference data, the positioning signals received from the one or more positioning satellites for the second instance in time, the second pseudo-range time measurement of the frequency and the second carrier phase time measurement of the frequency, based on the detected inability to receive the second reference data, to determine the second position of the rover station for the second instance in time, comprises:
double differencing values calculated for the first instance in time and values calculated for the second instance in time that are calculated for each of the at least two positioning satellites to generate a double differenced pseudo-range time measurement of the frequency and a double differenced carrier phase time measurement of the frequency, wherein double-differenced measurements are generated based on:

$$\nabla \Delta P_{mn,k}^{ij} = \nabla \Delta \rho_{mn}^{ij} + \nabla \Delta Orb_{mn}^{ij} - c \cdot \nabla \Delta dt_{s,mn}^{ij} + \nabla \Delta Trop_{mn}^{ij} + \frac{f_1^2}{f_k^2} \nabla \Delta Iono_{mn}^{ij} + \nabla \Delta v_k^{ij},$$

$$\nabla \Delta \Phi_{mn,k}^{ij} = \nabla \Delta \rho_{mn}^{ij} + \nabla \Delta Orb_{mn}^{ij} - c \cdot \nabla \Delta dt_{s,mn}^{ij} +$$
$$\nabla \Delta Trop_{mn}^{ij} - \frac{f_1^2}{f_k^2} \nabla \Delta Iono_{mn}^{ij} + \lambda \nabla \Delta N_{mn,k}^{ij} + \nabla \Delta \varepsilon_k^{ij},$$

where:
$\Delta$ is a single difference operator between epoch m and n;
$\nabla$ is a single difference operator between satellite i and j;
$\nabla \Delta P_{mn,k}^{ij}$ is double-differenced pseudo-range measurement of frequency k;
$\nabla \Delta \rho_{mn}^{ij}$ is double-differenced geometric distance;
$\nabla \Delta dt_{s,mn}^{ij}$ is double-differenced satellite clock residual;
$\nabla \Delta Orb_{mn}^{ij}$ is double-differenced satellite orbit residual;
$\nabla \Delta Trop_{mn}^{ij}$ is double-differenced troposphere residual;
$\nabla \Delta Iono_{mn}^{ij}$ is double-differenced ionosphere residual;
$\nabla \Delta v_k^{ij}$ is double-differenced multipath residual and noise of frequency k pseudo-range;
$\nabla \Delta \Phi_{mn,k}^{ij}$ is double-differenced carrier phase measurement of frequency k;
$\nabla \Delta N_{mn,k}^{ij}$ is double-differenced integer ambiguity of frequency k;
$\nabla \Delta \varepsilon_k^{ij}$ is double-differenced multipath residual and noise of frequency k carrier phase.

7. The method of claim 6, wherein the troposphere error and the ionosphere error are modeled before the double differencing.

8. The method of claim 7, wherein the ionosphere error is modeled using a Klobuchar model.

9. The method of claim 7, wherein the troposphere error is modeled using a Saastamoinen model.

10. The method of claim 6, wherein processing the virtual reference data, the positioning signals received from the one or more positioning satellites for the second instance in time, the second pseudo-range time measurement of the frequency and the second carrier phase time measurement of the frequency, based on the detected inability to receive the second reference data, to determine the second position of the rover station for the second instance in time, comprises:
estimating ionospheric errors and geometric errors, wherein the ionospheric errors and the geometric errors comprises satellite orbit and clock residuals, and tropospheric residuals; and
resolving ambiguities associated with the cycleslip.

11. The method of claim 6, wherein processing the virtual reference data, the positioning signals received from the one or more positioning satellites for the second instance in time, the second pseudo-range time measurement of the frequency and the second carrier phase time measurement of the frequency, based on the detected inability to receive the second reference data, to determine the second position of the rover station for the second instance in time, comprises:
estimating at least one state vector with a Kalman filter using the double differenced pseudo-range time measurement for the frequency and the double differenced carrier phase time measurement for the frequency.

12. The method of claim 1, wherein the virtual reference data is generated based on the detected inability to receive the second reference data from the at least one reference station, and one or more of during or subsequent to the processing of the virtual reference data, switching to the second reference data to determine the second position of the rover station or a third position of the rover station using the second reference data based on a detected recovery of an ability to receive the second reference data.

13. An apparatus comprising:
a processor; and
at least one non-transitory computer readable medium having computer-executable instructions stored thereon that, when executed by the processor, cause the apparatus to:
process a first reference data received from at least one reference station and positioning signals received from one or more positioning satellites to determine a first position of a rover station for a first instance in time;
generate a first rover data by:
calculate a first pseudo-range time measurement of a frequency for at least one positioning satellite of the one or more positioning satellites for the first instance in time, the first pseudo-range time measurement being a duration of time taken for data communicated in a positioning signal to travel from the at least one positioning satellite to the rover station for the first instance in time; and
calculate a first carrier phase time measurement of the frequency for the at least one positioning satellite of the one or more positioning satellites for the first instance in time, the first carrier phase time measurement being a transit time difference as determined by a time the positioning signal left the at least one positioning satellite according to a satellite clock and a time the positioning signal arrived at the rover station according to a receiver clock for the first instance in time;
detect an inability to receive a second reference data from the at least one reference station;
generate virtual reference data by the rover station, the virtual reference data being based on the first rover data generated by the rover station at the first instance in time and the first position of the rover station at the first instance in time;
generate a second rover data by:
calculate a second pseudo-range time measurement of the frequency for the at least one positioning satellite of the one or more positioning satellites for a second instance in time subsequent to the first instance in time, the second pseudo-range time measurement being a duration of time taken for data communicated in a positioning signal to travel from the at least one positioning satellite to the rover station for the second instance in time; and
calculate a second carrier phase time measurement of the frequency for the at least one positioning satellite of the one or more positioning satellites for the second instance in time, the second carrier phase time measurement being a transit time difference as determined by a time the positioning signal left the at least one positioning satellite according to the satellite clock and a time the positioning signal arrived at the rover station according to the receiver clock for the second instance in time;
process the virtual reference data, the positioning signals received from the one or more positioning satellites for the second instance in time, the second pseudo-range time measurement of the frequency and the second carrier phase time measurement of the frequency, based on the detected inability to receive the second reference data, to determine a second position of the rover station for the second instance in time;
performing an ambiguity resolution in response to a loss of lock or cycleslips between the virtual reference data at the first instance in time and the second rover data generated by the rover station at the second instance in time; and
generating an updated virtual reference data for future positioning based on an ambiguity fixed second rover data and second position of the rover station,
wherein the virtual reference data is generated from the first reference data based on:

$$P_{m,k}^i = \rho_m^i + c \cdot (dT_{r,m} - dt_{s,m}^i) + Orb_m^i + Trop_m^i + \frac{f_1^2}{f_m^2} Iono_m^i + v_k^i,$$

$$\Phi_{m,k}^i = \rho_m^i + c \cdot (dT_{r,m} - dt_{s,m}^i) + Orb_m^i + Trop_m^i - \frac{f_1^2}{f_k^2} Iono_m^i + \lambda_k N_{m,k}^i + \varepsilon_k^i,$$

where
$P_{m,k}^i$ is pseudo-range measurement of frequency k for satellite i at epoch m;
$\rho_m^i$ is geometric distance between satellite i and antenna phase center at epoch m;
c is speed of light in vacuum;
$dT_{r,m}$ is receiver clock error at epoch m;
$dt_{s,m}^i$ is satellite i clock error at epoch m;
$Orb_m^i$ is satellite i orbit error at epoch m;
$Trop_m^i$ is satellite i troposphere error at epoch m;
$Iono_m^i$ is satellite i ionosphere error at epoch m;
$f_1^2$ and $f_k^2$ are the square of frequency L1 and Lk, respectively, k may be 1, 2 or 3;
$v_k^i$ is multipath and noise of frequency k pseudo-range;
$\Phi_{m,k}^i$ is carrier phase measurement of frequency k for satellite i at epoch m;
$\lambda_k$ is wavelength of frequency k;
$N_{m,k}^i$ is integer ambiguity of frequency k for satellite i at epoch m;
$\varepsilon_k^i$ is multipath and noise of frequency k carrier phase.

14. The apparatus of claim 13, wherein the apparatus is further caused to:
take one or more errors into account as a part of the corresponding calculation when calculating the first pseudo-range time measurement of the frequency, calculating the first carrier phase time measurement of the frequency, calculating the second pseudo-range time measurement of the frequency, and calculating the second carrier phase time measurement of the frequency.

15. The apparatus of claim 14, wherein at least one of the one or more errors includes at least one of a time dependent relativistic clock error, a time dependent satellite orbit error, a troposphere error, an ionosphere error, a multipath error, carrier noise, or cycleslip.

16. The apparatus of claim 15, wherein the apparatus is further caused to:
single difference values calculated for the first instance in time and values calculated for the second instance in time when processing the virtual reference data, the positioning signals received from the one or more positioning satellites for the second instance in time, the second pseudo-range time measurement of the frequency and the second carrier phase time measurement of the frequency, based on the detected inability to receive the second reference data, to determine the second position of the rover station for the second instance in time.

17. The apparatus of claim 16, wherein the one or more positioning satellites comprises at least two positioning satellites, and the apparatus is further caused to:
single difference values calculated for the first instance in time and values calculated for the second instance in time that are calculated for each of the at least two positioning satellites when processing the virtual reference data, the positioning signals received from the one or more positioning satellites for the second instance in time, the second pseudo-range time measurement of the frequency and the second carrier phase time measurement of the frequency, based on the detected inability to receive the second reference data, to determine the second position of the rover station for the second instance in time.

18. The apparatus of claim 17, wherein the apparatus is further caused to:
double difference values calculated for the first instance in time and values calculated for the second instance in time that are calculated for each of the at least two positioning satellites to generate a double differenced pseudo-range time measurement of the frequency and a double differenced carrier phase time measurement of the frequency when processing the virtual reference data, the positioning signals received from the one or more positioning satellites for the second instance in time, the second pseudo-range time measurement of the frequency and the second carrier phase time measurement of the frequency, based on the detected inability to receive the second reference data, to determine the second position of the rover station for the second instance in time.

19. The apparatus of claim 18, wherein the apparatus is further caused to:
estimate at least one state vector with a Kalman filter using the double differenced pseudo-range time measurement for the frequency and the double differenced carrier phase time measurement for the frequency when processing the virtual reference data, the positioning signals received from the one or more positioning satellites for the second instance in time, the second pseudo-range time measurement of the frequency and the second carrier phase time measurement of the frequency, based on the detected inability to receive the second reference data, to determine the second position of the rover station for the second instance in time.

20. A mobile device, comprising:
a processor; and
at least one non-transitory computer readable medium having computer-executable instructions stored thereon that, when executed by the processor, cause the mobile device to:
process a first reference data received from at least one reference station and positioning signals received from at least two positioning satellites to determine a first position of a mobile device for a first instance in time;
generate a first rover data by:
calculate a first pseudo-range time measurement of a frequency for at least one positioning satellite of the at least two positioning satellites for the first instance in time, the first pseudo-range time measurement being a duration of time taken for data communicated in a positioning signal to travel from the at least one positioning satellite to the mobile device for the first instance in time; and
calculate a first carrier phase time measurement of the frequency for the at least one positioning satellite of the at least two positioning satellites for the first instance in time, the first carrier phase time measurement being a transit time difference as determined by a time the positioning signal left the at least one positioning satellite according to a satellite clock and a time the positioning signal arrived at the mobile device according to a receiver clock for the first instance in time;
detect an inability to receive a second reference data from the at least one reference station;
generate virtual reference data by the mobile device, the virtual reference data being based on the first reference data, the first position of the mobile device, the first pseudo-range time measurement of the frequency, and the first carrier phase time measurement of the frequency;
generate a second rover data by:
calculate a second pseudo-range time measurement of the frequency for the at least one positioning satellite of the at least two positioning satellites for a second instance in time subsequent to the first instance in time, the second pseudo-range time measurement being a duration of time taken for data communicated in a positioning signal to travel from the at least one positioning satellite to the mobile device for the second instance in time; and
calculate a second carrier phase time measurement of the frequency for the at least one positioning satellite of the at least two positioning satellites for the second instance in time, the second carrier phase time measurement being a transit time difference as determined by a time the positioning signal left the at least one positioning satellite according to the satellite clock and a time the positioning signal arrived at the mobile device according to the receiver clock for the second instance in time;
process the virtual reference data, the positioning signals received from the one or more positioning satellites for the second instance in time, the second pseudo-range time measurement of the frequency and the second carrier phase time measurement of the frequency, based on the detected inability to receive the second reference data, to determine a second position of the mobile device for the second instance in time, taking one or more errors into account as a part of the corresponding calculation when calculating the first pseudo-range time measurement of a frequency, calculating the first carrier phase time measurement of the frequency, calculating the second pseudo-range time measurement of the frequency, and calculating the second carrier phase time measurement of the frequency, by:
single differencing values calculated for the first instance in time and values calculated for the second instance in time;
single differencing values calculated for the first instance in time and values calculated for the second instance in time that are calculated for each of the at least two positioning satellites;

double differencing values calculated for the first instance in time and values calculated for the second instance in time that are calculated for each of the at least two positioning satellites to generate a double differenced pseudo-range time measurement of the frequency and a double differenced carrier phase time measurement of the frequency; and estimating at least one state vector with a Kalman filter using the double differenced pseudo-range time measurement for the frequency and the double differenced carrier phase time measurement for the frequency to mitigate at least one of the one or more errors, performing an ambiguity resolution in response to a loss of lock or cycleslips between the virtual reference data at the first instance in time and the second rover data generated by the mobile device at the second instance of time; and generating an updated virtual reference data for future positioning based on an ambiguity fixed second rover data and second position of the mobile device, wherein the virtual reference data is generated from the first reference data based on:

$$P_{m,k}^i = \rho_m^i + c \cdot (dT_{r,m} - dt_{s,m}^i) + Orb_m^i + Trop_m^i + \frac{f_1^2}{f_m^2} Iono_m^i + v_k^i,$$

$$\Phi_{m,k}^i = \rho_m^i + c \cdot (dT_{r,m} - dt_{s,m}^i) + Orb_m^i + Trop_m^i - \frac{f_1^2}{f_k^2} Iono_m^i + \lambda_k N_{m,k}^i + \varepsilon_k^i,$$

where
- $P_{m,k}^i$ is pseudo-range measurement of frequency k for satellite i at epoch m;
- $\rho_m^i$ is geometric distance between satellite i and antenna phase center at epoch m;
- c is speed of light in vacuum;
- $dT_{r,m}$ is receiver clock error at epoch m;
- $dt_{s,m}^i$ is satellite i clock error at epoch m;
- $Orb_m^i$ is satellite i orbit error at epoch m;
- $Trop_m^i$ is satellite i troposphere error at epoch m;
- $Iono_m^i$ is satellite i ionosphere error at epoch m;
- $f_1^2$ and $f_k^2$ are the square of frequency L1 and Lk, respectively, k may be 1, 2 or 3;
- $v_k^i$ is multipath and noise of frequency k pseudo-range;
- $\Phi_{m,k}^i$ is carrier phase measurement of frequency k for satellite i at epoch m;
- $\lambda_k$ is wavelength of frequency k;
- $N_{m,k}^i$ is integer ambiguity of frequency k for satellite i at epoch m;
- $\varepsilon_k^i$ is multipath and noise of frequency k carrier phase.

* * * * *